US009076195B2

(12) United States Patent
Mohammad et al.

(10) Patent No.: US 9,076,195 B2
(45) Date of Patent: Jul. 7, 2015

(54) METHODS AND APPARATUS TO IDENTIFY COMPONENTS FROM IMAGES OF THE COMPONENTS

(71) Applicant: The Boeing Company, Chicago, IL (US)

(72) Inventors: Alimuddin Mohammad, Sammamish, WA (US); Joseph F. Floyd, University Place, WA (US); Brent L. Hadley, Kent, WA (US); Patrick J. Eames, Bellevue, WA (US); Robert J. Rencher, Normandy Park, WA (US); Shan Luh, Kenmore, WA (US)

(73) Assignee: THE BOEING COMPANY, Chicago, IL (US)

( * ) Notice: Subject to any disclaimer, the term of this patent is extended or adjusted under 35 U.S.C. 154(b) by 49 days.

(21) Appl. No.: 14/014,027

(22) Filed: Aug. 29, 2013

(65) Prior Publication Data

US 2015/0063627 A1    Mar. 5, 2015

(51) Int. Cl.
*G06K 9/00* (2006.01)
*G06T 7/00* (2006.01)
*G06K 9/62* (2006.01)

(52) U.S. Cl.
CPC .............. *G06T 7/001* (2013.01); *G06K 9/6202* (2013.01)

(58) Field of Classification Search
CPC ..................... G06T 2207/30148; G06T 7/001; G06T 7/0044; G06T 2207/30141; G06T 7/0006; G06T 7/0083; G06T 7/0004; G06T 2207/30108; G06T 2207/30164; G06T 7/0002; G06T 7/0024; G01N 21/95607; G01N 21/956; G01N 21/9501; G01N 2021/8825; G01N 2021/95615; G01N 2021/95676; G01N 21/8851; G01N 25/72; G01N 2021/8822; G01N 2021/8854; G01N 2021/8861
USPC ................................ 382/141–152, 181–231
See application file for complete search history.

(56) References Cited

U.S. PATENT DOCUMENTS

| 4,648,053 A | * | 3/1987 | Fridge | 382/147 |
| 5,533,144 A | * | 7/1996 | Fan | 382/135 |

(Continued)

FOREIGN PATENT DOCUMENTS

WO    2005/057474    6/2005

OTHER PUBLICATIONS

David G. Lowe, "Distinctive Image Features from Scale-Invariant Keypoints," International Journal of Computer Vision, Jan. 5, 2004 (28 pages).

(Continued)

*Primary Examiner* — Alex Liew
(74) *Attorney, Agent, or Firm* — Hanley, Flight & Zimmerman, LLC

(57) ABSTRACT

Methods and apparatus to identify components from images of components are disclosed. An example method includes generating first keypoint signatures of an object from at least one image of the object and identifying the object using the first keypoint signatures. Identifying the object comprises: comparing the first keypoint signatures to assembly reference keypoint signatures at a first level in a hierarchical database, the assembly reference keypoint signatures comprising keypoint signatures of multiple views of assemblies containing sets of components; and based on the comparison of the first keypoint signatures to the assembly reference keypoint signatures, comparing the first keypoint signatures to component keypoint signatures at a second level in a hierarchical database lower than the first level, the component reference keypoint signatures comprising keypoint signatures of the components.

21 Claims, 11 Drawing Sheets

(56) References Cited

U.S. PATENT DOCUMENTS

| | | | | |
|---|---|---|---|---|
| 6,259,827 B1* | 7/2001 | Nichani | | 382/291 |
| 6,385,340 B1* | 5/2002 | Wilson | | 382/218 |
| 6,925,203 B1* | 8/2005 | Tanaka | | 382/151 |
| 6,992,574 B2 | 1/2006 | Aupperle et al. | | |
| 7,151,854 B2 | 12/2006 | Shen et al. | | |
| 8,081,820 B2* | 12/2011 | Davis et al. | | 382/173 |
| 8,406,522 B1 | 3/2013 | Owechko et al. | | |
| 2003/0086626 A1* | 5/2003 | Yamada | | 382/291 |
| 2003/0095681 A1* | 5/2003 | Burg et al. | | 382/100 |
| 2004/0001142 A1* | 1/2004 | Kumhyr | | 348/143 |
| 2006/0165288 A1* | 7/2006 | Lee et al. | | 382/181 |
| 2007/0014467 A1* | 1/2007 | Bryll | | 382/152 |
| 2007/0127816 A1* | 6/2007 | Balslev et al. | | 382/181 |
| 2011/0110581 A1 | 5/2011 | Yang et al. | | |
| 2011/0286628 A1 | 11/2011 | Goncalves et al. | | |
| 2012/0070078 A1 | 3/2012 | Sharma | | |
| 2012/0114175 A1* | 5/2012 | Hwang et al. | | 382/103 |
| 2012/0314919 A1* | 12/2012 | Sparks et al. | | 382/128 |
| 2013/0001295 A1 | 1/2013 | Goncalves | | |
| 2013/0016899 A1 | 1/2013 | Li et al. | | |
| 2013/0163858 A1 | 6/2013 | Kim et al. | | |

OTHER PUBLICATIONS

Calonder et al., "Keypoint Signatures for Fast Learning and Recognition," Swiss National Science Foundation, 2008 (14 pages).

Intellectual Property Office, "UK Search Report", issued in connection with GB Patent Application No. GB1415320.9, dated Feb. 17, 2015 (3 pages).

* cited by examiner

METHODS AND APPARATUS TO IDENTIFY COMPONENTS FROM IMAGES OF THE COMPONENTS

FIELD OF THE DISCLOSURE

This disclosure relates generally to machine vision, and, more particularly, to methods and apparatus to identify components from images of the components.

BACKGROUND

In the manufacturing industry, a manufacturer may have an enormous catalog of components for use in various assemblies. A worker trying to identify a particular component by sight may have many different choices and, therefore, may not be able to easily identify the component or find an exact replacement for the component. Additionally, in some cases a worker may be unable to quickly determine an appropriate location for a component, such as where a component should be placed. There is a need to accurately determine, in real-time, a part number or other information of an unidentified part being viewed for tasks such as remote maintenance applications, accurate parts shipment, and inspections.

SUMMARY

Example methods disclosed herein include generating first keypoint signatures of an object from at least one image of the object and identifying the object using the first keypoint signatures. Identifying the object comprises comparing the first keypoint signatures to assembly reference keypoint signatures, the assembly reference keypoint signatures comprising keypoint signatures of multiple views of assemblies containing sets of components; and based on the comparison of the first keypoint signatures to the assembly reference keypoint signatures, comparing the first keypoint signatures to component reference keypoint signatures, the component reference keypoint signatures comprising keypoint signatures of the components.

Example apparatus disclosed herein include a keypoint signature generator and a keypoint signature matcher. The keypoint signature generator generates first keypoint signatures of an object from at least one image of the object. The keypoint signature matcher identifies the object using the first keypoint signatures by: comparing the first keypoint signatures to assembly reference keypoint signatures, the assembly reference keypoint signatures comprising keypoint signatures of multiple views of assemblies containing sets of components; and based on the comparison of the first keypoint signatures to the assembly reference keypoint signatures, comparing the first keypoint signatures to component reference keypoint signatures, the component reference keypoint signatures comprising keypoint signatures of the components.

The features, functions, and advantages that have been discussed can be achieved independently in various examples or may be combined in yet other examples further details of which can be seen with reference to the following description and drawings.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
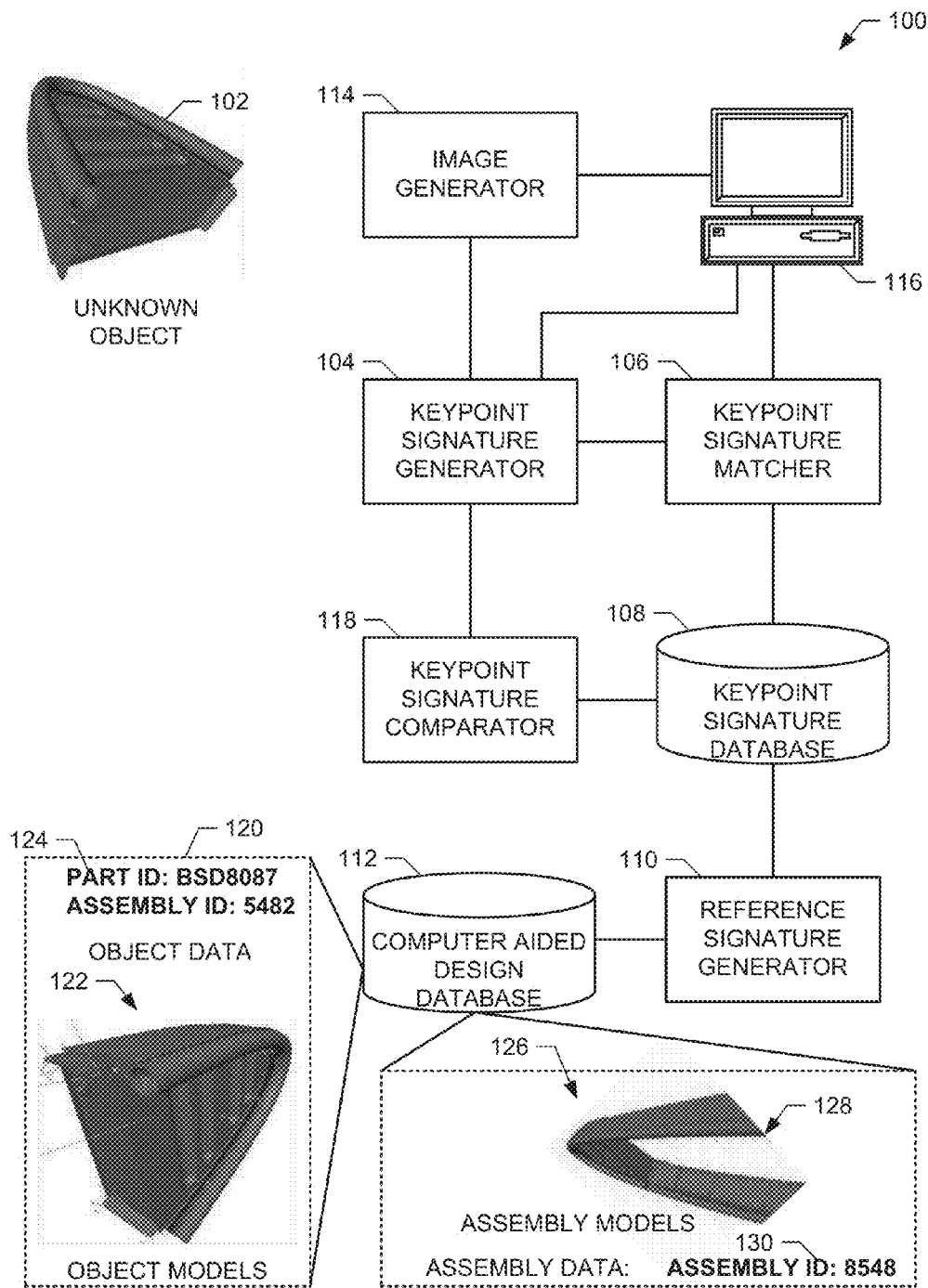
FIG. 1 is a block diagram of an example system to identify an object.

Complex systems, such as aircraft, can have several million parts (also referred to herein as components) and/or assemblies of those parts. As used herein, components, assemblies, and sub-assemblies may be referred to collectively as "objects" and/or "parts." To safely maintain such large and complex systems, airline maintenance personnel must frequently access maintenance information about many parts during periods when the aircraft asset is in use. Locating the required maintenance information in a timely manner is important to limiting interruptions to scheduled operations (e.g., maintenance operations, delivery operations, etc.). Often, when maintenance is performed on an object, component, or part, the maintenance personnel often need to know the part number reference corresponding to the component. While the part number or serial number of the part is sometimes on the component and visible to the maintenance personnel viewing the part, often such part number information is not readily visible or accessible. Some part numbers are relatively easy to find (e.g., if the part is listed in an illustrated parts catalog (IPC)), but frequently the process for finding the part number information is time consuming and difficult. For example, if an original equipment manufacturer (OEM) drawing system needs to be researched for required part number information, several hours may be required to find a specific part number for a specific system model and/or system serial number. In some cases, research of the part information must be performed away from the system by a person who is familiar with the particular system model and the document system and/or drawing system corresponding to that model. Once the part number is obtained, further research may be needed to find the information required to maintain the part or component. Significant time may be needed to research maintenance data provided by the OEM and, in some cases, an internal database of repair information.

Example methods and apparatus disclosed herein enable a person (e.g., a maintenance worker, etc.) to identify a component or assembly and its associated information by capturing a digital image or video of the component or assembly. In some examples, the image may be captured with any device that has communication capabilities and a sufficiently high-resolution image sensor such as a smart phone or other mobile device. Example methods and apparatus disclosed herein use the example image to automatically identify the component, find the part number, model number, a stock keeping number, and/or another identifier corresponding to the component, and/or be linked to maintenance information provided by the OEM or another party, quickly and without requiring the user to leave the location of the system. Examples of linked information include spare part availability in stores, maintenance and/or repair information, maintenance task cards, maintenance and/or repair history, part substitution information, engineering drawings, tooling requirements, and/or instructional videos.

Known methods for part or component recognition or identification include using radio frequency identification (RFID) tags to label components and identify the components using data stored on the RFID tags. However, application of the RFID tags to components is cumbersome and costly. Other known methods for component recognition include pattern recognition that operate on image streams and detect shape patterns with complex features using pre-determined shape criteria. These methods are highly sensitive to the orientation or angle of view of the component.

In contrast to known methods of component identification, example methods and apparatus disclosed herein provide robust, inexpensive, and reliable component recognition in real-time. In some examples disclosed herein, an image of a component to be identified is captured using a digital camera or video camera device and can be identified from the image irrespective of the view or orientation of the captured component in the image. Example methods and apparatus significantly improve the accuracy of component recognition by using keypoint signatures of multiple views or orientations of the component.

Example methods and apparatus disclosed herein determine keypoint signatures to detect features (e.g., corners, junctions, ridges, etc.) of an object from an image. Example keypoint signatures include a set of keypoints expressed as vectors, with each vector describing a particular feature of the object.

Example methods and apparatus disclosed herein use a hierarchical database of objects and corresponding reference keypoint signatures. In some examples, the hierarchical database organizes the reference keypoint signatures as assemblies, sub-assemblies of the assemblies, sub-assemblies of sub-assemblies, and/or components of assemblies and/or sub-assemblies. Each assembly, sub-assembly, and component in the example database includes multiple keypoint signatures corresponding to multiple viewpoints of the assembly, sub-assembly, or component. Storing and/or referencing multiple reference keypoint signatures increases the likelihood that a keypoint signature of a component or an assembly is correctly matched to a correct reference keypoint signature irrespective of the orientation of the component or assembly in the image.

In some examples, each component is associated with a part number or other identifier such that, when a component is identified, its associated part number is provided to the requester. Additionally or alternatively, components may be associated with a sub-assembly or assembly to which the component belongs, an identifier of a product and/or assembly line in which the component, sub-assembly, or assembly is used, and/or any other associated information.

In some examples, a reference signature generator generates the reference signatures (e.g., assembly reference signatures, component reference signatures, etc.) from computer models (e.g., computer aided design models) of the assemblies, sub-assemblies, and/or components. For example, the reference signature generator may obtain a computer model of a component, render an image of the component from a first viewpoint, and generate keypoint signatures from the image. The example reference signature generator renders additional images of the component from alternate viewpoints and generates keypoint signatures from the additional images. A reference signature database stores the generated reference keypoint signatures at a sub-level in the hierarchical structure (e.g., at a level below an assembly of which the component is a part) and in association with information about the component. In some examples, the reference signature generator obtains the computer models for an assembly and/or for each of the components in an assembly. Using the model(s), the example reference signature generator renders images of the assembly from multiple viewpoints and generates multiple assembly reference signatures from the images. A reference signature database stores the generated assembly reference keypoint signatures in association with information about the component.

In addition to component identification, example methods and apparatus disclosed herein may be used to detect damage and/or deformation of an assembly, sub-assembly, and/or component. Often, physical damage or deformation of a component enables the identification of new keypoints relative to an undamaged specimen at the location of the damage. By identifying keypoints (e.g., a keypoint signature) from an image of an assembly, sub-assembly, and/or component to reference keypoints (e.g., a keypoint signature from a model of the assembly, sub-assembly, and/or component), potential damage can be identified by the introduction of keypoints in the specimen being examined. In some examples, a keypoint signature comparator estimates an extent of deformation or damage to a assembly, sub-assembly, and/or component by a number, magnitude and/or orientation of the new keypoints present in the specimen.

FIG. 1 is a block diagram of an example system 100 to identify an object 102 (e.g., an assembly, a sub-assembly, or a component). The example system 100 of FIG. 1 includes a keypoint signature generator 104, a keypoint signature matcher 106, a keypoint signature database 108, a reference signature generator 110, a computer aided design (CAD) database 112, an image generator 114, a user device 116, and a keypoint signature comparator 118. The system 100 of FIG. 1 may be organized, divided, and/or combined using any number of interconnected devices.

The example keypoint signature generator 104 of FIG. 1 generates keypoint signatures from an image of the object 102. For example, the image generator 114 captures an image of the object 102 in response to a command from a user via the user device 116. In some examples, the user device 116 includes the image generator 114 (e.g., a digital image sensor and associated software in a device). The example image generator 114 of FIG. 1 is a digital imaging device that captures individual digital images (e.g., still images) and/or video (e.g., continuous images). The image generator 114 captures and transmits the image(s) to the example keypoint signature generator 104 (e.g., via a wired or wireless connection, via a network such as a local area network (LAN) and/or the Internet, etc.). The example keypoint signature generator 104 may analyze the image(s) as they are received (e.g., generated keypoint signatures of images in real-time) and/or analyze the image(s) in bulk upon receipt of multiple images.

To generate the keypoint signatures, the example keypoint signature generator 104 identifies keypoints in the image obtained via the image generator 114. Example keypoints may include a vector that specifies a location (e.g., x and y coordinates), a magnitude, and an orientation (e.g., a normalized orientation). Additionally or alternatively, keypoints may be expressed as a vector of 128 keypoint gradients (which, in some examples, is weighted with a Gaussian function). An example method to identify the keypoints is the keypoint localization method used in the scale-invariant feature transform (SIFT) method. However, other methods of identifying keypoints may be used, such as the speeded up robust features (SURF) method.

Example keypoint signatures include a vector describing the keypoints identified in the image. In some examples, the number of keypoints in the signature is limited, such that the keypoint signature generator 104 generates signatures to have the most distinctive and/or stable keypoints in the image (e.g., keypoints most resistant to noise, scaling, blur, etc.). Limiting the number of keypoints in the signature may maintain matching accuracy and also increasing the efficiency with which keypoint signatures can be matched against a large database.

The example keypoint signature generator 104 of FIG. 1 may generate multiple keypoint signatures based on the image to, for example, enhance the speed at which a matching keypoint signature can be found. For example, where the image provided by the image generator 114 includes an assembly in which the object of interest is installed or otherwise included, the keypoint signature generator 104 may receive an indication of the location of the object of interest within the image of the object 102 (e.g., from the user via the user device 116). The keypoint signature generator 104 generates a first keypoint signature (e.g., a component keypoint signature) of the indicated location in the image and generates a second keypoint signature (e.g., an assembly keypoint signature) of a larger portion of the image that includes the indicated location. In this manner, the example keypoint signature matcher 106 may use the keypoint signatures of both the assembly and the component to identify the object.

The example keypoint signature matcher 106 compares the keypoint signature generated by the keypoint signature generator 104 with keypoint signatures stored in the keypoint signature database 108. In the example of FIG. 1, the keypoint signature matcher 106 searches the keypoint signature database 108 using generated keypoint signatures. To search the keypoint signature database 108, the example keypoint signature matcher 106 of FIG. 1 first attempts to match the generated keypoint signature to a first level of reference keypoint signatures (e.g., assembly reference keypoint signatures).

To compare a keypoint signature to a reference keypoint signature, the example keypoint signature matcher 106 of FIG. 1 determines a number of keypoints in the generated keypoint signature that have the smallest Euclidean distance from a same number of keypoints in the reference keypoint signature. For example, the keypoint signature matcher 106 compares each keypoint in the generated keypoint signature with each keypoint in the reference keypoint signature to determine a pair of keypoints (one in the generated signature, one in the reference signature) that have a smallest Euclidean distance between the pair. The keypoint signature matcher 106 determines whether the Euclidean distance between the pair is less than a threshold. In some examples, the keypoint signature matcher 106 determines additional pair(s) of keypoints (one keypoint in the pair being in the generated signature, the other keypoint in the pair being in the reference signature) having next smallest keypoints, and determining whether the additional pair(s) also have less than a threshold Euclidean distance, which may be different than the threshold used for the first pair. If a sufficient number of pair(s) of keypoints have less than a threshold Euclidean distance, the keypoint signature matcher 106 determines that the generated keypoint signature and the reference keypoint signature are a potential match. Other methods of keypoint searching and/or matching may be used.

In some examples, the keypoint signature matcher 106 receives a first keypoint signature of an area of the image designated by a user (e.g., a designated object of interest) and a second keypoint signature of a larger portion of the image that includes the designated area (e.g., an assembly that includes the designated object of interest). The keypoint signature matcher 106 first attempts to identify the larger portion of the image by comparing the second keypoint signature to keypoint signatures at the highest levels of the keypoint signature database 108. If the larger portion of the image is identified (e.g., as a first assembly), the example keypoint signature matcher 106 attempts to identify the designated object of interest. By first identifying the first assembly within the image, the example keypoint signature matcher 106 can reduce the portion of the keypoint signature database 108 to be searched to the components and/or sub-assemblies related to and at a lower level than the identified first assembly (e.g., the sub-assemblies and components included in the assembly). By performing the search using the multiple keypoint signatures from the image, the example keypoint signature matcher 106 can increase the efficiency and speed with which the object of interest is identified.

Additionally or alternatively, the keypoint signature matcher 106 may narrow a search space in the keypoint signature database 108 by matching keypoints from an object of interest to keypoints at a sub-assembly or assembly at a higher level. For example, while an object of interest may be partially occluded in an assembly or sub-assembly, portions of the object of interest that are visible from a viewpoint may enable matching of some keypoints. If the keypoint signature matcher 106 determines that some keypoints are matched but not enough keypoints to identify matching keypoint signatures, the keypoint signature matcher 106 may narrow the search space to the assembly or sub-assembly to which some keypoints were matched. This method of narrowing the search space increases the speed and efficiency with which the object of interest is identified.

In some examples, the keypoint signature matcher 106 processes the keypoint signatures in the keypoint signature database 108 to identify similar keypoint signatures that could result in confusion to a user of the system 100. For example, assemblies, sub-assemblies, and/or components may be designed and manufactured to have different sizes but similar relative dimensions, which could confuse a user who is only looking at an image of a matched assembly, sub-assembly, or component with a frame of reference for the size. As another example, different assemblies, sub-assemblies, and/or components may have distinguishing feature(s) that are not recognizable when viewed from one or more viewpoints of those assemblies, sub-assemblies, and/or components. Other situations may similarly give rise to confusion as to whether a matching assembly, sub-assembly, or component has actually been identified. The keypoint signature matcher 106 compares each keypoint signature to the other keypoint signatures in the database to determine whether any pairs of keypoint signatures have at least a threshold similarity (e.g., a threshold number of matching keypoints and/or a threshold number of matching keypoints based on a relaxed or reduced standard for matching) that could cause a user to mistake a first assembly, sub-assembly, and/or component with other assemblies, sub-assemblies, and/or components. If such a threshold similarity exists, the example keypoint signature matcher 106 appends or stores indications of the similarities and/or potential for confusion in the keypoint signature database 108 with each of the assemblies, sub-assemblies, and/or components identified as similar.

Figure 2:
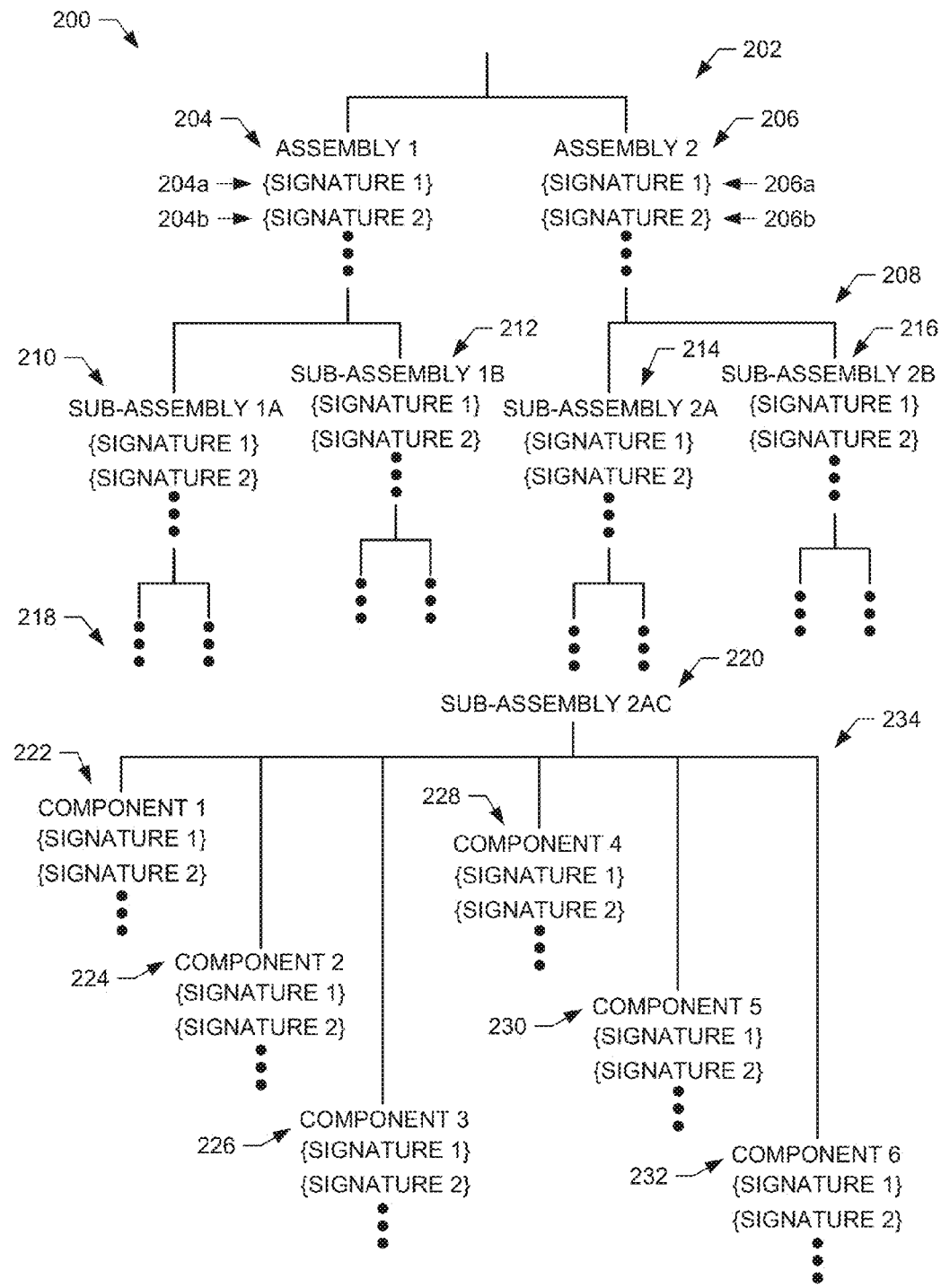
FIG. 2 illustrates an example hierarchical database structure that may be used to implement a keypoint signature database.

Objects (e.g., assemblies) at the first level of reference keypoint signatures are each related to other objects (e.g., sub-assemblies, components) at a second, lower level of reference keypoint signatures. FIG. 2 illustrates an example hierarchical database structure 200 that may be used to implement a keypoint signature database such as the keypoint signature database 108 of FIG. 1.

The example hierarchical database structure 200 of FIG. 2 includes a top level 202, which includes highest-level assemblies and/or components that are not included in assemblies. The top level 202 includes assemblies 204, 206. Each of the assemblies 204, 206 is represented by multiple keypoint signatures 204a, 204b, 206a, 206b. The keypoint signatures 204a, 204b, 206a, 206b correspond to different rendered images from different viewpoints of the assemblies 204, 206.

At a second level 208, the example structure 200 includes sub-assemblies 210, 212, 214, 216. The example sub-assemblies 210, 212 are sub-assemblies of the example assembly 204. The example sub-assemblies 214, 216 are sub-assemblies of the example assembly 206.

The example structure 200 further includes a second sub-assembly level 218 that includes a second sub-assembly 220. The example sub-assembly 220 is a sub-assembly of the example sub-assembly 214 (and, therefore, is also a sub-assembly of the assembly 206). The assembly 204 is related to the sub-assemblies 210, 212 (and any sub-assemblies and/or components of the sub-assemblies 210, 212). The assembly 206 is related to the sub-assemblies 214, 216, 220 and to the components 222-232 (and any other sub-assemblies and/or components of the sub-assemblies 214, 216, 220). The example sub-assembly 220 is related to multiple components 222-232 at a component level 234.

Returning to FIG. 1, the example CAD database 112 of FIG. 1 stores CAD designs and/or copies of CAD designs generated as part of a design process. The example reference signature generator 110 generates keypoint signatures using the same or similar generation method as described above with reference to the example keypoint signature generator 104 (e.g., to enable comparison of the same or similar keypoints for the same object).

A CAD design 120 includes object definition data, from which the reference signature generator 110 can render an image 122 of the object in the CAD design 120. The object definition data may define an assembly (e.g., an organized or assembled collection of sub-assemblies and/or components) and/or a component (e.g., the structure of a basic or non-segmentable part or object). The example CAD design 120 enables the reference signature generator 110 to render images of any viewpoint of the object. The reference signature generator 110 renders multiple images of the example CAD design 120 from different viewpoints (e.g., viewpoints substantially separated from each other), generates keypoint signatures of each of the multiple images, and stores the keypoint signatures in the keypoint signature database 108.

The example reference signature generator 110 populates the keypoint signature database 108 using computer models of components, assemblies, and/or sub-assemblies stored in the CAD database 112. The example keypoint signature database 108 stores the keypoint signatures for a same CAD design 120 in association with information 124 related to the CAD design 120 and/or links to the information 124, such as a part identifier, an assembly identifier, spare part availability in stores, maintenance and/or repair information, maintenance task cards, maintenance and/or repair history, part substitution information, engineering drawings, tooling requirements, and/or instructional videos. The reference signature generator 110 stores the keypoint signatures at the appropriate level of the hierarchical database structure (e.g., at a level below an assembly to which the object belongs, at a level above components or sub-assemblies that are part of the object).

The example CAD database 112 further includes assembly and/or sub-assembly information 126. The assembly information 126 of an example assembly included in the CAD database 112 includes an image of an assembly 128 and assembly data 130, such as an assembly identifier. The example CAD database 112 may store assemblies and/or sub-assemblies as collections of individual components, including arrangements and/or connections of the components in the assemblies. The example reference signature generator 110 may render images of the assemblies in a manner similar to rendering images of components based on the CAD design 120. However, portions of the components in an assembly may be occluded when the assembly is rendered, such that not all components present in an assembly may be visible when rendered.

Figure 3:
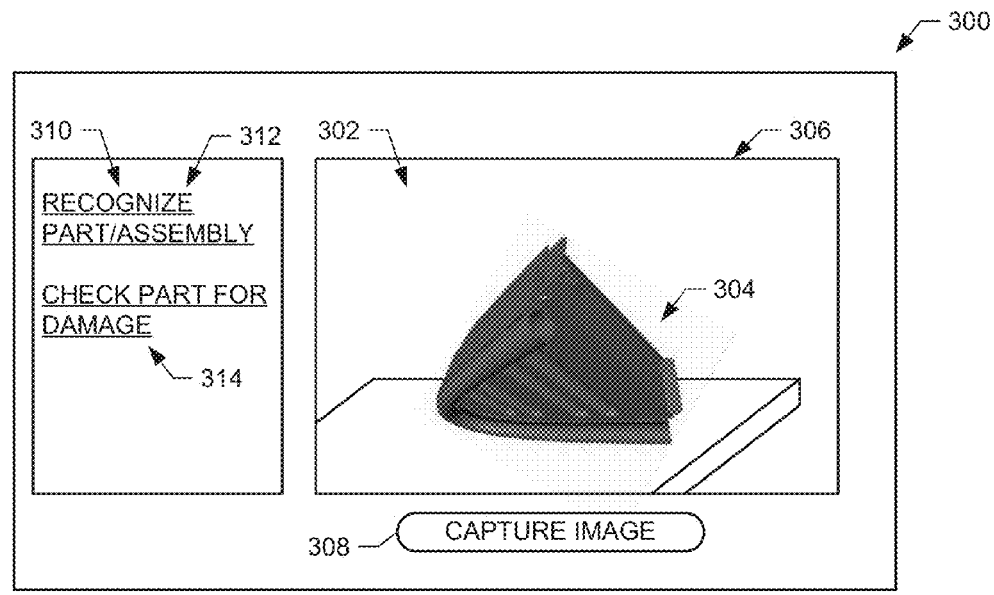
FIG. 3 illustrates an example user interface that may be used to capture an image of an object of interest to be identified.

FIG. 3 illustrates an example user interface 300 that may be used to capture an image 302 of an object of interest 304 to be identified. The example user interface 300 may be presented to a user via the example user device 116 of FIG. 1. The example user interface 300 includes an image capture window 306 that displays an image currently being captured by the image generator 114. A "capture image" button 308 in the user interface 300 enables the user to cause the image generator 114 to generate an image of the view shown in the capture window 306 (e.g., when the user determines that the object of interest 304 is within the capture window 306).

The example user interface 300 of FIG. 3 further includes a navigation bar 310 that includes links 312, 314 to functions of the user interface 300. The example link 312 initiates a part or assembly recognition process such as the process disclosed herein. The example link 314 initiates a process to check a part for damage such as the process described below.

Figure 4:
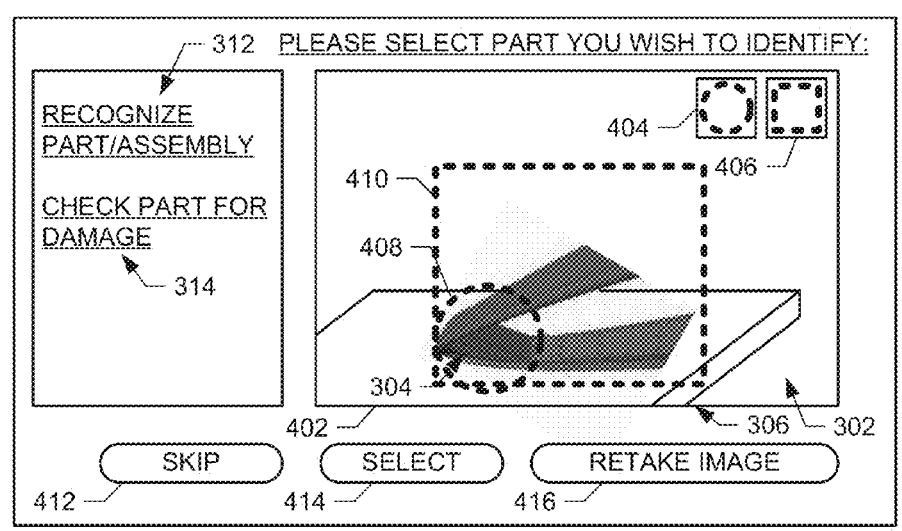
FIG. 4 illustrates an example user interface that may be used to select or highlight a portion of an image such that the selected or highlighted portion is representative of an object of interest.

FIG. 4 illustrates an example user interface 400 that may be used to select or highlight a portion of the image 302 such that the selected or highlighted portion is representative of the object of interest 304 of FIG. 3. The example user device 116 shows the user interface 400 in response to the user capturing the image 302 (e.g., by selecting the "capture image" button 308 of FIG. 3).

The user interface 400 illustrated in FIG. 4 includes an image selection window 402 and selection tools 404, 406. The user may select either of the selection tools 404, 406 to select (e.g., highlight) a portion 408, 410 of the image area 306. If the example portion 408 is highlighted (e.g., a component of an object of interest 304), the example keypoint signature generator 104 of FIG. 1 generates multiple keypoint signatures from the image 302 such as a keypoint signature of the entire image 302 (e.g., an assembly keypoint signature) and a keypoint signature of the highlighted portion 408 (e.g., a component keypoint signature). If the example portion 410 is highlighted, the example keypoint signature generator 104 generates a signature including the portion 410 (e.g., a highlighted portion of at least a threshold percentage of the image 302, a highlighted portion of a foreground of the image 302, an illuminated portion of the image 302, etc.), and may omit additional keypoint signatures of a larger portion of the image 302.

The example interface 400 includes a skip button 412, a select button 414, and a retake image button 416. The example skip button 412, when selected by the user (e.g., via a cursor, touchscreen touch command, and/or other user command), submits the image 302 (e.g., transmits the image from the user device 116 and/or the image generator 114) to the keypoint signature generator 104 for generation of a keypoint signature. The example select button 414 confirms any highlights made to the image 302 via the selection tools 404, 406, and submits the image 302 and the highlighted portions 408, 410 to the example keypoint signature generator 104 for generation of the keypoint signature(s). The example retake image button 416 causes the example user device 116 and/or the image generator 114 to discard the image 302 and to return to the user interface 300 of FIG. 3 to capture a different image.

Figure 5:
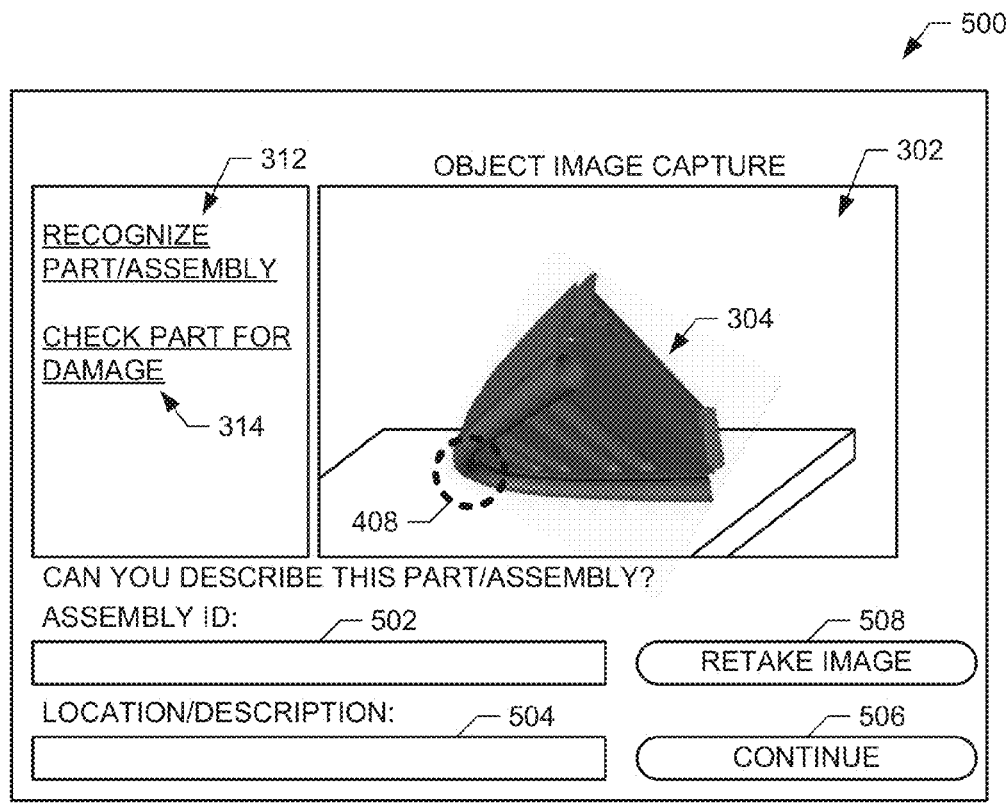
FIG. 5 illustrates an example user interface that may be used to describe an object of interest to narrow a reference keypoint search space in a database for keypoint matching.

FIG. 5 illustrates an example user interface 500 that may be used to describe the example object of interest 304 of FIG. 3 to narrow a reference keypoint search space in a hierarchical database for keypoint matching (e.g., the keypoint signature database 108). The example user interface 500 of FIG. 5 includes the image 302 of FIG. 3 and the highlighted portion 408 selected using the interface 400 of FIG. 4. In some examples, the user interface 500 may crop the image 302 to a selection to be used for generating the keypoints (e.g., the highlighted portion 410 of FIG. 4).

The user interface 500 further includes an assembly identifier field 502 in which a user may enter information known about an assembly in which the object of interest 304 is included. Examples of such information may include a known assembly identifier, a model number or stock keeping number of an assembly or sub-assembly, and/or a model number, a stock keeping number or a serial number of a top-level assembly or object (e.g., a vehicle, such as an aircraft). The example user interface 500 further includes a location or description field 504. The example location/description field 504 enables a user to enter a description (e.g., a natural language description, a keyword description, a Boolean search string, etc.) of the object of interest 304 and/or a description of the location of the object of interest 304 (e.g., left wing, nose landing gear, etc.).

The example keypoint signature matcher 106 of FIG. 1 is provided with any information entered into the assembly identifier field 502 and/or the location/description field 504 and narrows the search space in the keypoint signature database 108 using any identified assembly information in the fields 502, 504. For example, the keypoint signature matcher 106 queries an assembly database (e.g., the keypoint signature database 108, the CAD database 112) based on the assembly identifier field 502 to determine whether the assembly identifier identifies a valid assembly. If the assembly identifier has a valid assembly identifier, the keypoint signature matcher 106 restricts an initial keypoint signature matching attempt to components and sub-assemblies related to the identified assembly. Narrowing the search space causes the keypoint signature matcher 106 to compare generated keypoint signatures to a subset of possible component reference keypoint signatures (e.g., when the keypoint signature of the image 302 matches at least one of the assembly reference keypoint signatures and/or when assembly information is provided that describes and/or matches at least one of the assemblies in the database).

Additionally or alternatively, the example keypoint signature matcher 106 queries a component and/or assembly database (e.g., the keypoint signature database 108, the CAD database 112) using keywords derived from the example location/description field 504 (e.g., keywords entered by the user, synonyms generated by natural language search software, etc.). If the example keypoint signature matcher 106 identifies an assembly, a sub-assembly, and/or a component (e.g., to at least a threshold relevance to the search terms) based on information in the location/description field 504, the example keypoint signature matcher 106 restricts an initial keypoint signature matching attempt to components and/or sub-assemblies related to the identified assembly, sub-assembly, and/or component (e.g., at levels of the hierarchical database below the identified assembly, sub-assembly, and/or component).

The example user interface 500 includes a continue button 506 to enable the user to submit any information entered into the fields 502, 504 to the example keypoint signature matcher 106. When the user selects the continue button 506, the example user device 116 provides the image 302, the highlighted portion 408, and information entered into the fields 502, 504 to the keypoint signature generator 104 and/or the keypoint signature matcher 106. The keypoint signature generator 104 generates the keypoint signature(s) of the image 302 and/or the highlighted portion 408 and provides the keypoint signature(s) to the keypoint signature matcher 106. The keypoint signature matcher 106 restricts and performs the search of the keypoint signature database 108 when the keypoint signature(s) and, if applicable, the assembly identifier and/or location/description information are received. A retake image button 508 causes the example user device 116 and/or the image generator 114 to discard the image 302 and to return to the user interface 300 of FIG. 3 to capture a different image.

If the keypoint signature matcher 106 matches the keypoint signature of the object of interest 304 (e.g., of the image 302) to a keypoint signature in the keypoint signature database 108, the keypoint signature matcher 106 may obtain and return the information associated with the matched keypoint signature. Examples of information that the keypoint signature matcher 106 may obtain include a component/assembly identifier, a component/assembly description, an image of the component/assembly (e.g., an image generated from the CAD model of the component/assembly), a part identification number, a model number, a stock keeping number, a location on a vehicle, and/or linked information such as spare part availability in stores, maintenance and/or repair information, maintenance task cards, maintenance and/or repair history, part substitution information, engineering drawings, tooling requirements, and/or instructional videos.

Figure 6:
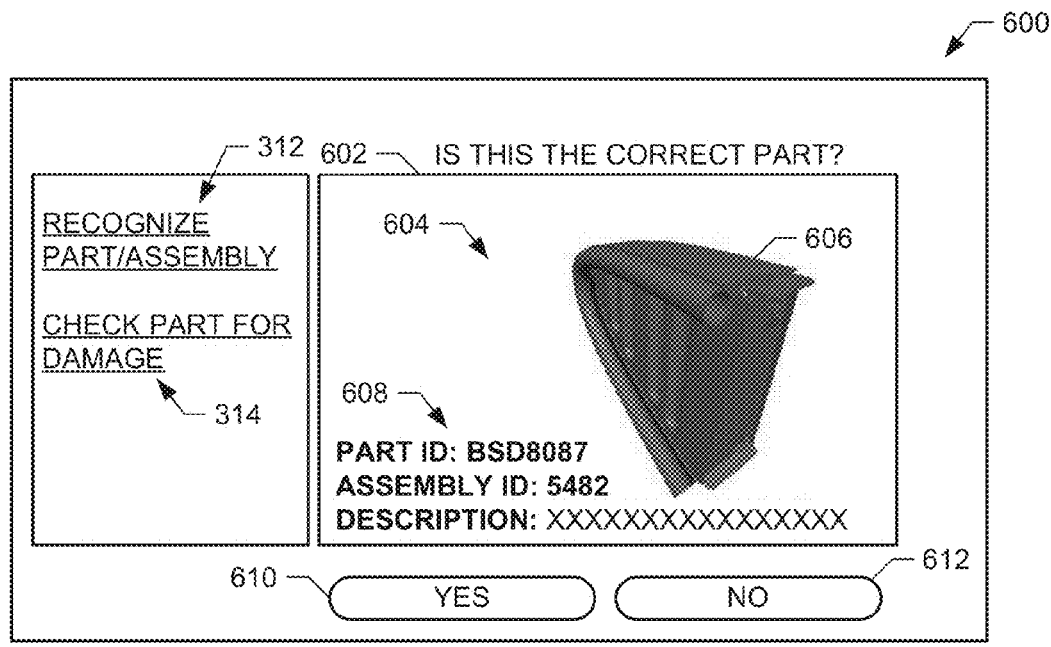
FIG. 6 illustrates an example user interface that may be used to enable a user to verify whether the object of interest was correctly identified.

FIG. 6 illustrates an example user interface 600 that may be used to enable a user to verify whether the object of 306 interest was correctly identified. The example user interface 600 includes a verification window 602 that displays an image 604 of an object 606 that the keypoint signature matcher 106 has determined to match an image of an object of interest (e.g., the image 302 of FIG. 3). The example image 604 may be a rendered image from which the matching keypoint signature was generated. The verification window 602 also shows information 608 associated with the object 606 obtained from the keypoint signature database 108. The example user interface 600 includes a yes button 610 which, when selected by the user via the user device 116, confirms that the identified component/assembly is the correct component/assembly. Based on the confirmation, the example keypoint signature matcher 106 provides linked information associated with the identified component/assembly. For example, the user interface 600 may provide linked information in the navigation bar 310, as a new interface, and/or as an overlay to the interface 600. Upon selection of a no button 612, the example keypoint signature matcher 106 continues to search the example keypoint signature database 108.

Returning to FIG. 1, the example keypoint signature comparator 118 compares keypoint signatures to determine differences between the compared signatures. For example, the keypoint signature comparator 118 may compare a keypoint signature generated from an image of an object of interest and a reference keypoint signature based on a model or second image of the object of interest. Differences in keypoint signatures of the same object can indicate, for example, deformation indicative of damage to the object. Because different images of the same object may result in different keypoint signatures, the keypoint signature comparator 118 may determine whether a difference between keypoint signatures is greater than a threshold.

Figure 7:
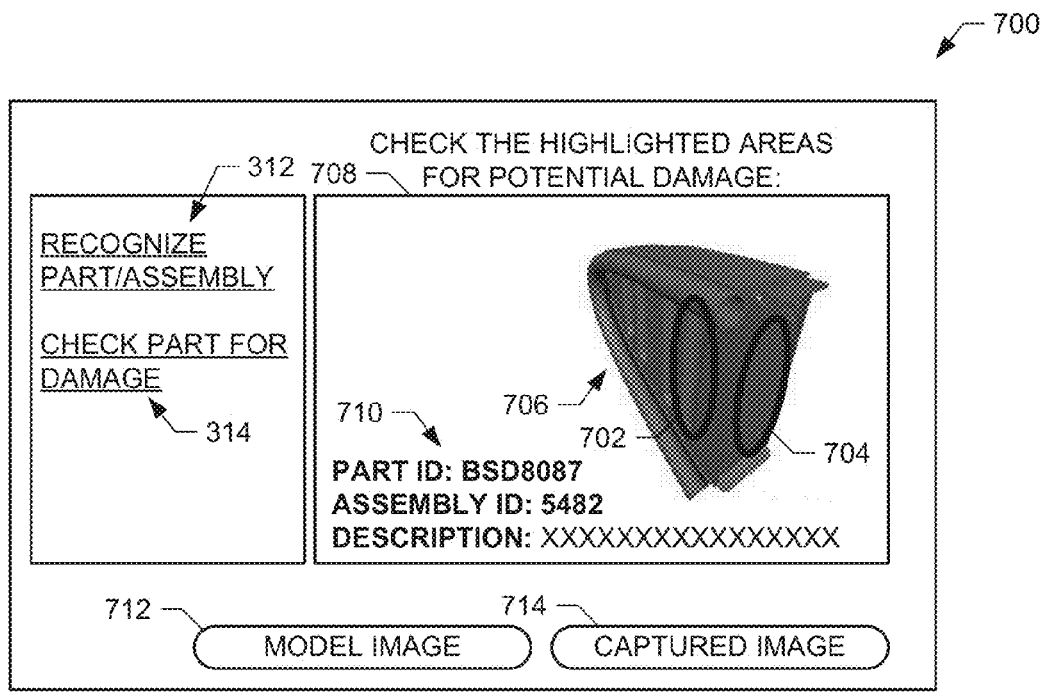
FIG. 7 illustrates an example user interface that may be used to highlight portions of an object to be inspected for potential damage.

FIG. 7 illustrates an example user interface 700 that may be used to highlight portions 702, 704 of an object 706 to be inspected for potential damage. The example user interface 700 includes an object view 708 that displays an image of the object 706 and information 710 about the object 706. The keypoint signature comparator 118 identifies and highlights the highlighted portions 702, 704 based on an identification of the highlighted portions 702, 704 as having substantial differences in keypoint signatures (e.g., an additional keypoint present in an image of the object 706 that is not present in an image rendered from a CAD model of the object 706).

The keypoint signature comparator 118 determines the location of the highlighted portions 702, 704 by determining the locations of the differences in keypoints (e.g., from the x and y location portions of the signatures). The keypoint signature comparator 118 translates the locations to the generated image of the object 706 (e.g., captured via the image generator 114) and/or to the rendered image of the object 706 (e.g., stored in the keypoint signature database 108, rendered from a CAD model of the object 706). The example user interface 700 includes a "model image" button 712 to cause the keypoint signature comparator 118 to highlight the locations 702, 704 using an image of the object 706 rendered from a model. The user interface 700 also includes a "captured image" button 714 to cause the keypoint signature comparator 118 to highlight the locations 702, 704 using an image of the object 706 captured via the image generator 114.

While an example manner of implementing the system 100 is illustrated in FIG. 1, one or more of the elements, processes and/or devices illustrated in FIG. 1 may be combined, divided, re-arranged, omitted, eliminated and/or implemented in any other way. Further, the example keypoint signature generator 104, the example keypoint signature matcher 106, the example keypoint signature database 108, the example reference signature generator 110, the example CAD database 112, the example image generator 114, the example user device 116, the example keypoint signature comparator 118 and/or, more generally, the example system 100 of FIG. 1 may be implemented by hardware, software, firmware and/or any combination of hardware, software and/or firmware. Thus, for example, any of the example keypoint signature generator 104, the example keypoint signature matcher 106, the example keypoint signature database 108, the example reference signature generator 110, the example CAD database 112, the example image generator 114, the example user device 116, the example keypoint signature comparator 118 and/or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example keypoint signature generator 104, the example keypoint signature matcher 106, the example keypoint signature database 108, the example reference signature generator 110, the example CAD database 112, the example image generator 114, the example user device 116, and/or the example keypoint signature comparator 118 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIG. 1 may include one or more elements, processes and/or devices in addition to, or instead of, those illustrated in FIG. 1, and/or may include more than one of any or all of the illustrated elements, processes and devices.

Flowcharts representative of example processes or methods for implementing the system 100 are shown in FIGS. 8, 9A, 9B, and 10. In this example, the processes may be implemented using machine readable instructions that comprise programs for execution by a processor such as the processor 1312 shown in the example processor platform 1300 discussed below in connection with FIG. 13. The programs may be embodied in software stored on a tangible computer readable storage medium such as a CD-ROM, a floppy disk, a hard drive, a digital versatile disk (DVD), a Blu-ray disk, or a memory associated with the processor 1312, but the entire programs and/or parts thereof could alternatively be executed by a device other than the processor 1312 and/or embodied in firmware or dedicated hardware. Further, although the example programs are described with reference to the flowchart illustrated in FIGS. 8, 9A, 9B, and 10, many other methods of implementing the example system 100 may alternatively be used. For example, the order of execution of the blocks may be changed, and/or some of the blocks described may be changed, eliminated, or combined.

As mentioned above, the example processes of FIGS. 8, 9A, 9B, and 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 8, 9A, 9B, and 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 8:
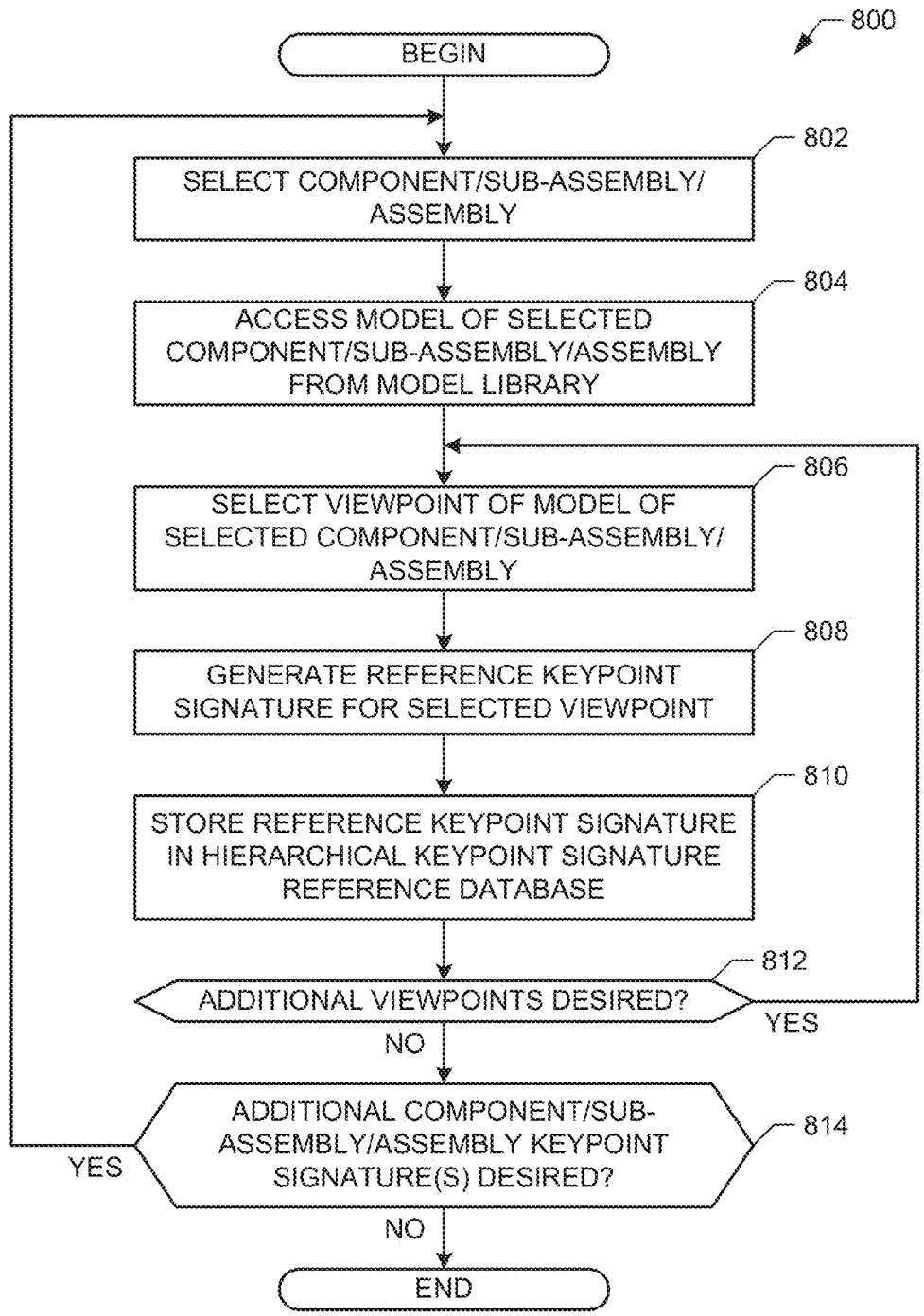
FIG. 8 is a flowchart representative of an example method to generate and store reference keypoint signatures.

FIG. 8 is a flowchart representative of an example method 800 to generate and store reference keypoint signatures. The example method 800 may be performed by the example system 100 of FIG. 1.

The reference signature generator 110 of FIG. 1 selects a component, sub-assembly, or assembly (block 802). The reference signature generator 110 may select the component, sub-assembly, or assembly from a list of components, sub-assemblies, and/or assemblies for which signatures are to be generated (e.g., from the CAD database 112 of FIG. 1). The reference signature generator 110 accesses a model of the selected component, sub-assembly, or assembly from a model library, such as the CAD database 112 (block 804). The model includes structure data that can be interpreted by a CAD program to render three-dimensional views of the model from any desired viewpoint.

The reference signature generator 110 selects a viewpoint of the model of the selected component, sub-assembly, or assembly (block 806). Selection of a viewpoint may be predetermined (e.g., certain viewpoint angles are used for each component, sub-assembly, or assembly) or variable (e.g., viewpoints are selected based on characteristics of the model rendering at a viewpoint). For example, the reference signature generator 110 may select variable viewpoints by analyzing the features of the model, and determining a viewpoint that has features that are likely to produce a robust keypoint signature and/or are not overly duplicative with another viewpoint of the model.

The reference signature generator 110 generates a reference keypoint signature for the selected viewpoint (block 808). The example reference keypoint signature includes a set of keypoints (e.g., 32 keypoints, expressed as four numbers including x and y location coordinates, magnitude, and orientation). The reference signature generator 110 stores the generated reference keypoint signature in a hierarchical keypoint signature reference database (e.g., the keypoint signature database 108 of FIG. 1) (block 810). The reference signature generator 110 stores the reference keypoint signature in the keypoint signature database 108 in association with information about the selected component, sub-assembly, or assembly. If a reference keypoint signature is already stored in the keypoint signature database 108 for the selected component, sub-assembly, or assembly, the reference signature generator 110 adds the generated reference keypoint signature to the reference keypoint signatures for the selected component, sub-assembly, or assembly (e.g., as an alternative viewpoint).

The reference signature generator 110 determines whether reference keypoint signatures of additional viewpoints are desired (block 812). For example, a minimum number of viewpoints may be desired for each component, sub-assembly, or assembly. Additionally or alternatively, an analysis of a model of the selected component, sub-assembly, or assembly may reveal that more than the minimum number of viewpoints should be generated for the selected component, sub-assembly, or assembly due to the complexity of the component, sub-assembly, or assembly and/or a need for additional viewpoints to adequately represent the selected component, sub-assembly, or assembly. For example, additional viewpoint(s) may be useful or necessary for a component, sub-assembly, or assembly that includes features visible from a first viewpoint and occludes other features of the component, sub-assembly, or assembly when viewed from that viewpoint. If additional viewpoints are desired (block 812), control returns to block 806 to select another viewpoint of the model.

If additional viewpoints of the selected component, sub-assembly, or assembly are desired (block 812), the reference signature generator 110 determines whether keypoint signatures are desired for additional component(s), sub-assembl(ies), and/or assembl(ies) (block 814). For example, keypoint signature(s) may be desired for component(s), sub-assembl(ies), and/or assembl(ies) for which keypoint signatures have not yet been developed (e.g., newly designed and/or modified components, sub-assemblies, and assemblies). If keypoint signatures are desired for additional component(s), sub-assembl(ies), and/or assembl(ies) (block 814), control returns to block 802 to select another component, sub-assembly, or assembly. When no additional keypoint signatures for components, sub-assemblies, or assemblies (block 814), the example method 800 ends.

Figure 9A:
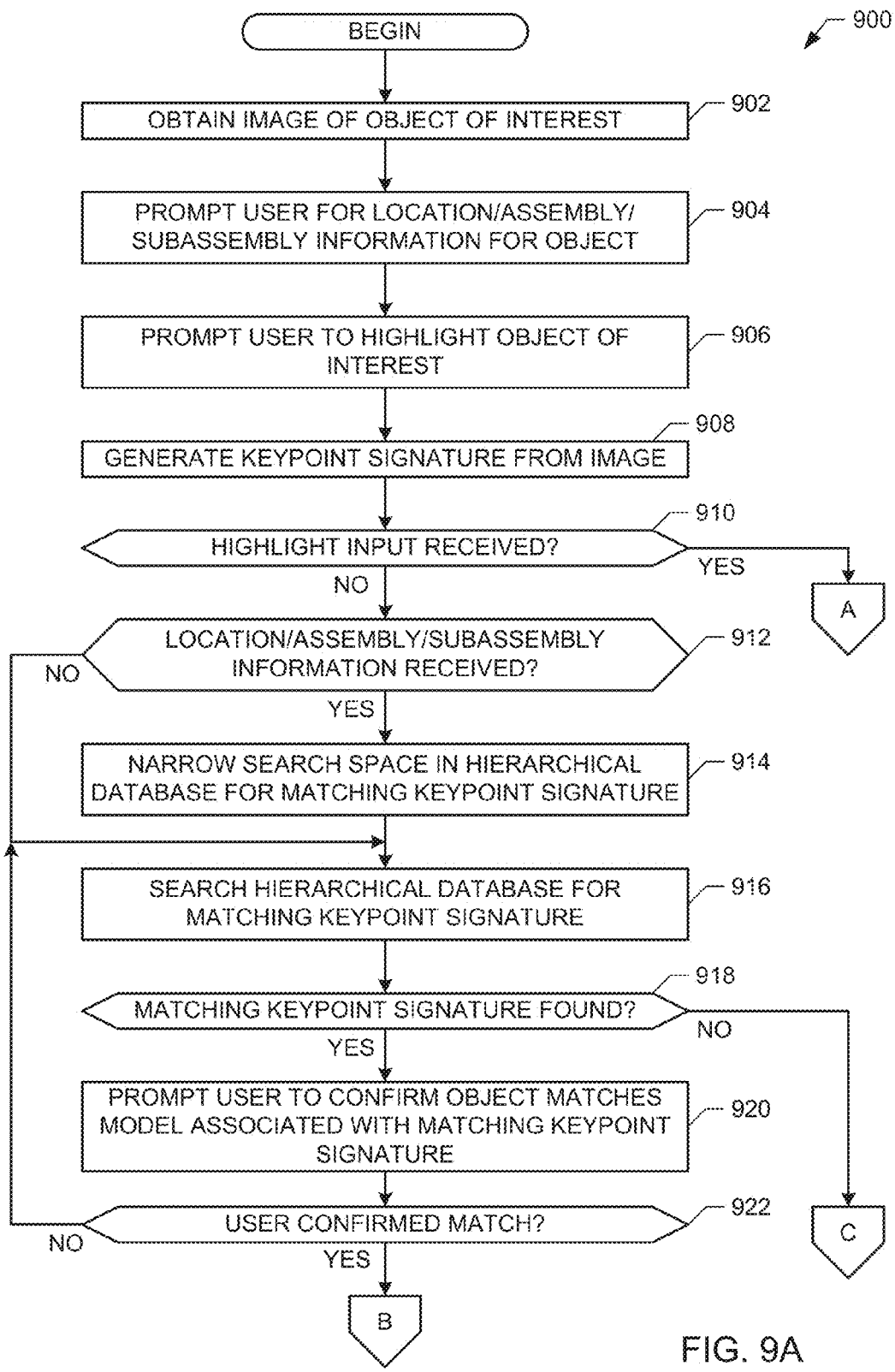
FIGS. 9A and 9B are flowcharts representative of an example method to identify an object using an image of the object and reference keypoint signatures.
Figure 9B:
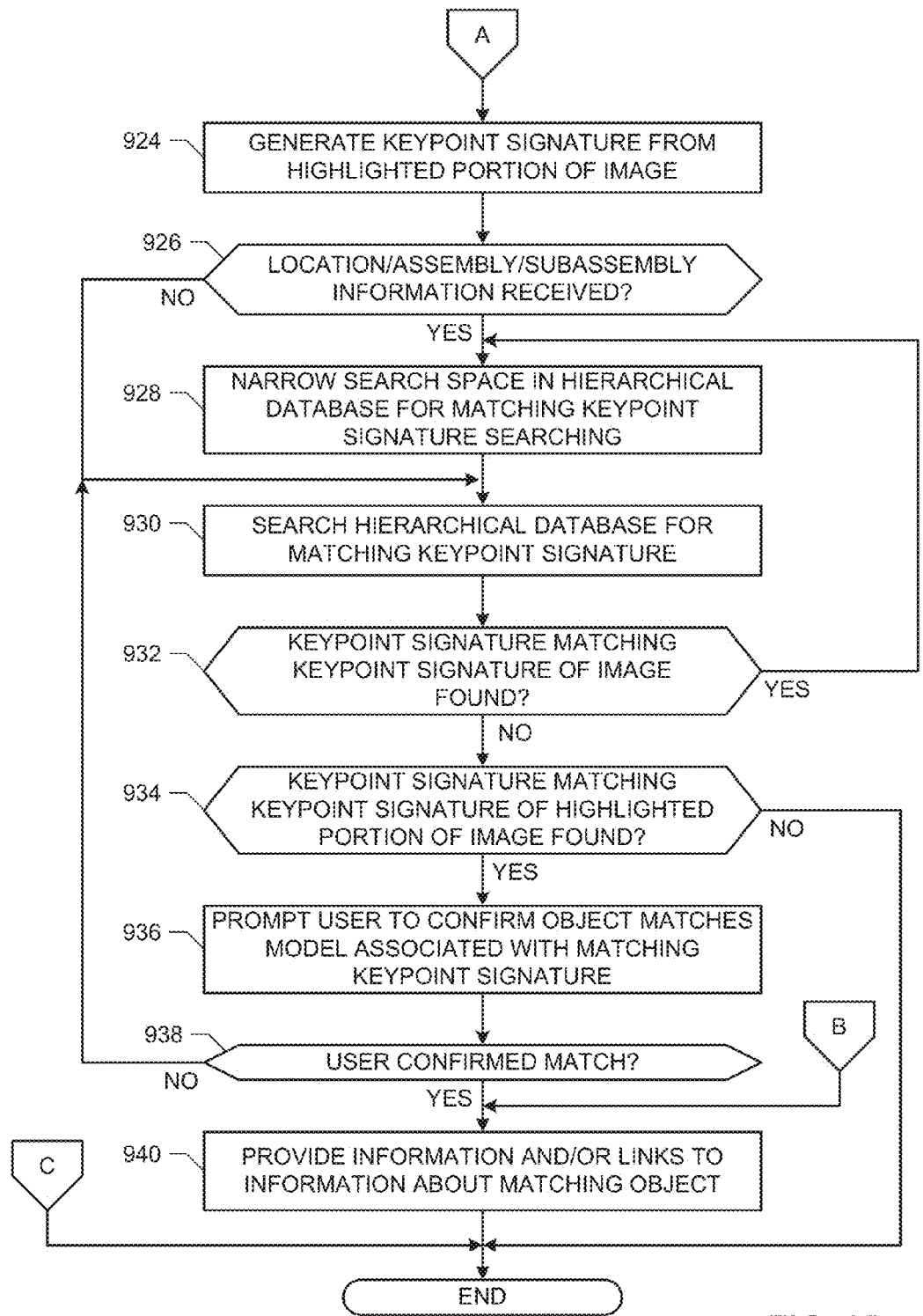

FIGS. 9A and 9B collectively illustrate is a flowchart representative of an example method 900 to identify an object using an image of the object and reference keypoint signatures. The example method 900 of FIG. 9 may be performed by the system 100 of FIG. 1.

The example image generator 114 of FIG. 1 obtains an image of an object of interest (e.g., an unidentified object 102 to be identified via the system 100) (block 902). For example, the image generator 114 may capture the image of the object 102 in response to a user placing the object in the field of view of the image generator 114 and selecting the capture image button 308 of FIG. 3 via the user device 116. In some examples, the image generator 114 and/or the user device 116 may prompt the user to confirm that the generated image is correct (e.g., sufficiently representative of the object 102, sufficiently high quality, not blurry, etc.). The keypoint signature generator 104, the image generator 114, and/or the user device 116 prompts the user for location information, assembly information, and/or sub-assembly information for the object 102 (block 904). For example, the user device 116 may present the user interface 500 of FIG. 5. The user may enter location information, assembly information, sub-assembly information, and/or any other description information into the fields 502, 504. Alternatively, the user may not provide this information.

The example image generator 114 and/or the user device 116 prompts the user to highlight an object of interest (block 906). For example, the image generator 114 and/or the user device 116 may present the example user interface 400 of FIG. 4 including the selection tools 404, 406 and the captured image 302. The user may highlight a portion of the image using the interface 400. In other cases, the user may determine that highlighting is not appropriate or necessary to identify the object of interest 306.

The example keypoint signature generator 104 generates a keypoint signature from the image 302 (block 908). For example, the keypoint signature generator 104 identifies keypoints in the image 302, selects the most robust or stable of the identified keypoints, and generates a keypoint signature including the selected keypoints. For example, the keypoint signature generator 104 may generate a 128-number keypoint signature vector including 32 keypoints. Other numbers of keypoints may be used.

If highlight input has not been received (e.g., via the user interface 400 of FIG. 4) (block 910), the example keypoint signature matcher 106 determines whether location information, assembly information, sub-assembly information, and/or any other information has been received (e.g., from the user via the interface 500 of FIG. 5) (block 912). If location information, assembly information, sub-assembly information, and/or any other information has been received (block 912), the keypoint signature matcher 106 narrows a search space in a hierarchical database (e.g., the keypoint signature database 108 of FIG. 1) for matching the keypoint signature (e.g., a component keypoint signature) generated by the keypoint signature generator 104 (block 914). For example, if information is received that indicates an assembly in which the object of interest 306 is included (e.g., the assembly 206 of FIG. 2), the example keypoint signature matcher 106 narrows the search space from the entire keypoint signature database 108 (e.g., the hierarchical database structure 200 of FIG. 2) to levels related to and below the identified assembly (e.g., the sub-assemblies 214 and 216, the sub-assembly 220, components 222-232, and sub-assemblies and/or components related to the sub-assembly 216) in the keypoint signature database 108.

After narrowing the search space (block 914), or if no location information, assembly information, sub-assembly information, and/or any other information has been received (block 912), the keypoint signature matcher 106 searches the hierarchical database (e.g., the keypoint signature database 108) for a keypoint signature matching the generated keypoint signature (block 916). If a matching keypoint signature is found (block 918), the example keypoint signature matcher 106 prompts the user (e.g., via the user device 116) to confirm that the object of interest 306 matches the model associated with the matching keypoint signature (block 920). For example, the keypoint signature matcher 106 may provide the user interface 600 of FIG. 6, including a rendered image 604 corresponding to the matching keypoint signature and/or a description of the model from which the rendered image was generated to the user via the user device 116.

If the user does not confirm that the identified model and/or keypoint signature matches the object of interest 306 (e.g., selects the no button 612 of FIG. 6) (block 922), control returns to block 916 to continue searching the database.

Turning to FIG. 9B, if highlight input is received (block 910 of FIG. 9A), the example keypoint signature generator 104 generates a keypoint signature (e.g., a component keypoint signature) from the highlighted portion of the image (e.g., the portion 408 of FIG. 4) (block 924). As a result, the example keypoint signature generator 104 generates two keypoint signatures for the image 302; a first keypoint signature of the entire image 302 and/or a portion of the image 302 larger than the highlighted portion 408 (e.g., an assembly keypoint signature), and a second keypoint signature of the highlighted portion 408 of the image 302 (e.g., a component keypoint signature).

If location information, assembly information, sub-assembly information, and/or any other information has been received (block 926), the keypoint signature matcher 106 narrows a search space in a hierarchical database (e.g., the keypoint signature database 108 of FIG. 1) for matching the keypoint signature (e.g., a component keypoint signature) generated by the keypoint signature generator 104 (block 928). Narrowing the search space causes the keypoint signature matcher 106 to compare the first keypoint signatures to a subset of the component reference keypoint signatures (e.g., when the keypoint signature of the image 302 matches at least one of the assembly reference keypoint signatures).

After narrowing the search space (block 928), or if no location information, assembly information, sub-assembly information, and/or any other information has been received (block 926), the keypoint signature matcher 106 searches the hierarchical database (e.g., the keypoint signature database 108) for a keypoint signature matching the generated keypoint signature (block 930). The example keypoint signature matcher 106 may search the keypoint signature database 108 for keypoint signatures matching one or both of the generated signatures. When performing the search, the keypoint signature matcher 106 compares the generated keypoint signatures to assembly reference keypoint signatures at a first (e.g., higher) level in the reference signature database 108 and/or compares the generated keypoint signatures to component keypoint signatures at lower level(s) in the reference signature database 108.

If a keypoint signature matching the keypoint signature of the image 302 (e.g., an assembly keypoint signature) is found (block 932), control returns to block 928 to further narrow the search space for the search. If a keypoint signature matching the keypoint signature of the image 302 is not found (block 932), the example keypoint signature matcher 106 determines whether a keypoint signature matching the keypoint signature of the highlighted portion 408 (e.g., a component keypoint signature) is found (block 934). If a keypoint signature matching the keypoint signature of the highlighted portion 408 is found (block 934), the example keypoint signature matcher 106 prompts the user (e.g., via the user device 116) to confirm that the object of interest 306 matches the model associated with the matching keypoint signature (block 936). For example, the keypoint signature matcher 106 may provide the user interface 600 of FIG. 6, including a rendered image 604 corresponding to the matching keypoint signature and/or a description of the model from which the rendered image was generated to the user via the user device 116.

If the user does not confirm that the identified model and/or keypoint signature matches the object of interest 306 (e.g., selects the no button 612 of FIG. 6) (block 938), control returns to block 930 to continue searching the database. If the user confirms that object of interest 306 matches the identified model and/or keypoint signature (block 922 or 938), the example keypoint signature matcher 106 and/or the user device 116 provides information and/or links to information about the matching object (block 940). For example, the user device 116 may display information and/or links to information associated with the CAD design of the matching object such as a part identifier, an assembly identifier, spare part availability in stores, maintenance and/or repair information, maintenance task cards, maintenance and/or repair history, part substitution information, engineering drawings, tooling requirements, and/or instructional videos.

After providing the information and/or links to information (block 940), or if the keypoint signature matcher 106 fails to find a matching keypoint signature (block 918 or 934), the example method 900 ends.

Figure 10:
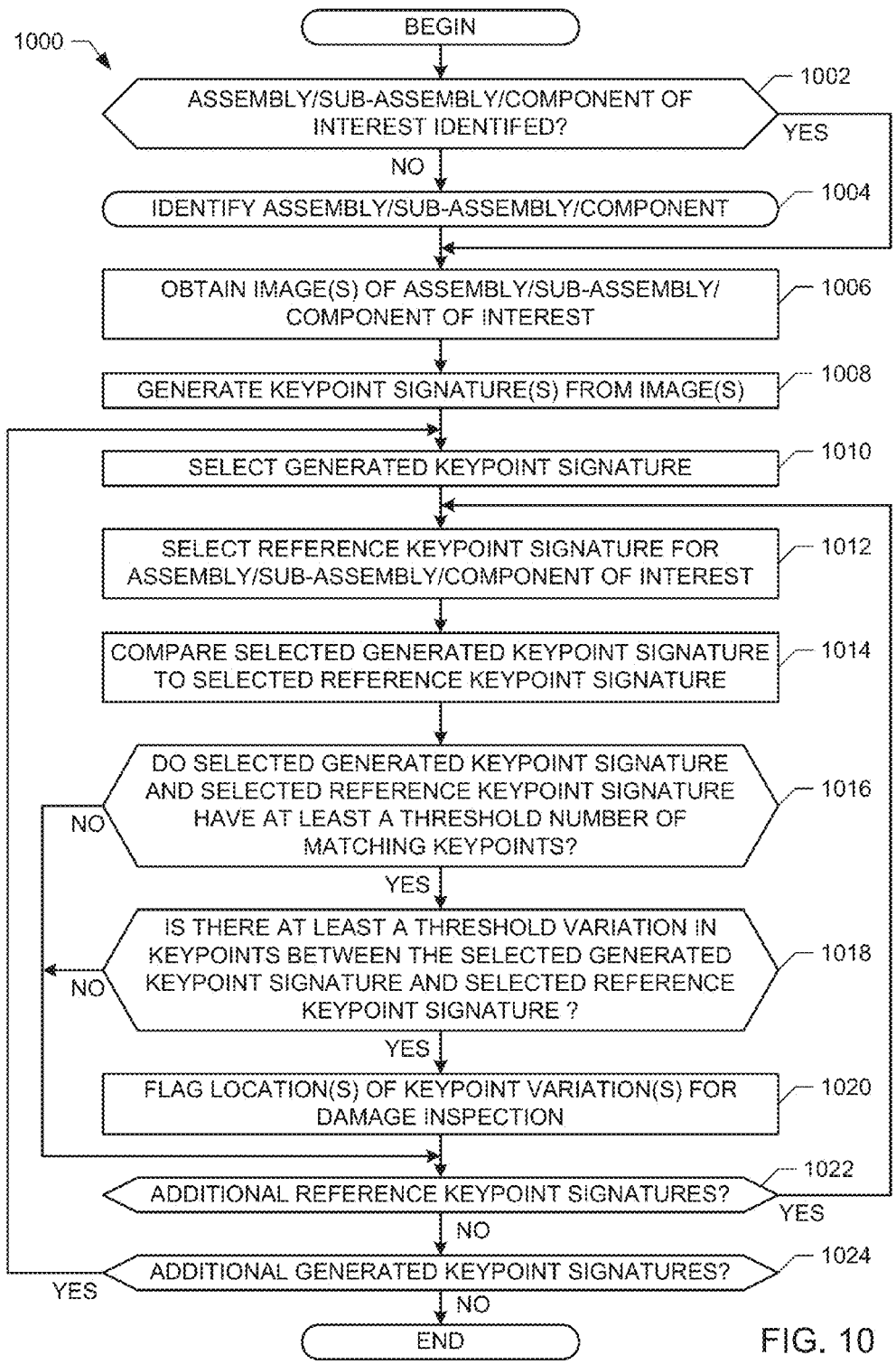
FIG. 10 is a flowchart representative of an example method to identify areas of potential damage to an object based on an image of the object and a reference keypoint signature of the object.

FIG. 10 is a flowchart of an example method 1000 to identify areas of potential damage to an object based on an image of the object and a reference keypoint signature of the object. The example method 1000 may be performed by the example system 100 of FIG. 1.

The example keypoint signature comparator 118 of FIG. 1 determines whether an assembly, sub-assembly, or component of interest (e.g., the object 102 of FIG. 1) has been identified (block 1002). For example, a user may manually identify the assembly, sub-assembly, or component of interest, and/or block 1002 may be performed subsequent to identifying an object via the method 900 of FIGS. 9A and 9B. If the assembly, sub-assembly, or component of interest has not been identified (block 1002), the example keypoint signature matcher 106 identifies the assembly, sub-assembly, or component of interest (block 1004). Block 1004 may be implemented using the example method 900 of FIGS. 9A and 9B.

When the assembly, sub-assembly, or component of interest has been identified (block 1002 or 1004), the keypoint signature generator 104 obtains image(s) of the assembly, sub-assembly, or component of interest (block 1006). The keypoint signature comparator 118 may obtain the image(s) via the image generator 114 and/or the user device 116 of FIG. 1. The example keypoint signature generator 104 generates keypoint signature(s) from the image(s) (block 1008).

The example keypoint signature comparator 118 selects a generated keypoint signature (block 1010). The keypoint signature comparator 118 selects a reference keypoint signature for the assembly, sub-assembly, or component of interest (block 1012). For example, the keypoint signature database 108 may contain multiple signatures for the assembly, sub-assembly, or component of interest corresponding to different viewpoints. In some examples, the keypoint signature comparator 118 may prompt the user (e.g., via the user device 116) to select a keypoint signature for a viewpoint that is most similar to the image from which the selected generated keypoint signature was generated.

The keypoint signature comparator 118 compares the selected generated keypoint signature to the selected reference keypoint signature (block 1014). For example, the keypoint signature comparator 118 re-orients one of the signatures to compare keypoints having corresponding locations and orientations, determines a similarity between the keypoint signatures, and identifies any significant differences between the keypoint signatures (e.g., additional keypoints in the keypoint signature of the select keypoint signature generated by the keypoint signature generator 104).

The keypoint signature comparator 118 determines whether the selected generated keypoint signature and the selected reference keypoint signature have at least a threshold number of matching keypoints (block 1016). By determining that the keypoint signatures have at least a threshold number of matching keypoints, the keypoint signature comparator 118 determines that the keypoint signatures can be effectively compared (e.g., ensuring that the keypoint signature comparator 118 is not comparing keypoint signatures of different viewpoints of the object of interest). If the selected generated keypoint signature and the selected reference keypoint signature have at least a threshold number of matching keypoints (block 1016), the keypoint signature comparator 118 determines whether the selected generated keypoint signature and the selected reference keypoint signature have at least a threshold variation in keypoints (block 1018). For example, the keypoint signature comparator 118 may determine that one or more keypoints are present (or missing) in the generated keypoint signature when compared with the reference keypoint signature.

If the selected generated keypoint signature and the selected reference keypoint signature have at least a threshold number of matching keypoints (block 1016) and have at least a threshold variation in keypoints (block 1018), the keypoint signature comparator 118 flags the location(s) of keypoint variation(s) for damage inspection (block 1020). For example, the keypoint signature comparator 118 may present the user interface 700 of FIG. 7 to the user including flags (e.g., highlights) at the location(s) 702, 704 at which keypoint differences are detected.

After flagging the location(s) of keypoint variation(s) (block 1020), if there is not at least a threshold variation in keypoints (block 1018), or if the selected generated keypoint signature and the selected reference keypoint signature do not have at least a threshold number of matching keypoints (block 1016), the keypoint signature comparator 118 determines whether there are additional reference keypoint signatures to be matched (block 1022). If there are additional reference keypoint signatures (block 1022), control returns to block 1012 to select another reference keypoint signature. When there are no additional reference keypoint signatures (block 1022), the keypoint signature comparator 118 determine whether there are additional generated keypoint signatures to be compared to reference keypoint signatures (block 1024). If there are additional generated keypoint signatures (block 1024), control returns to block 1010 to select another generated keypoint signature. When there are no additional generated keypoint signatures (block 1024), the example method 1000 ends.

Figure 11:
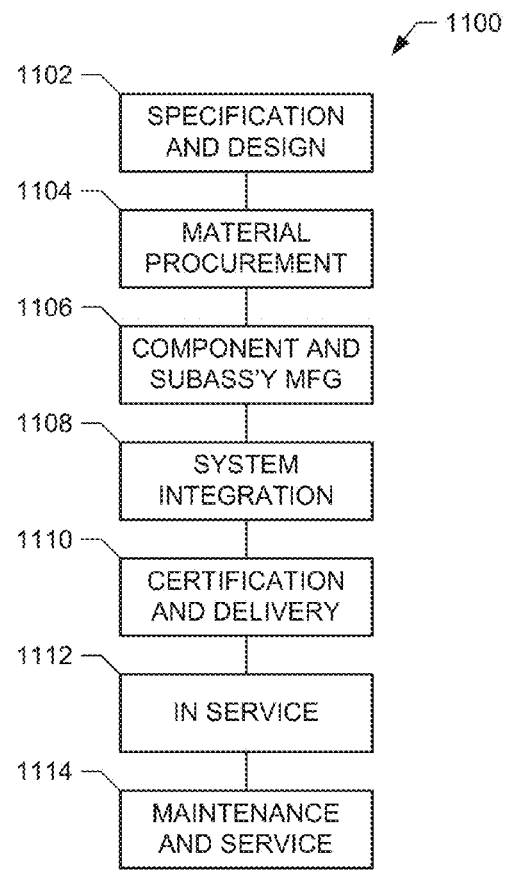
FIG. 11 is a flowchart of platform production and service methodology.
Figure 12:
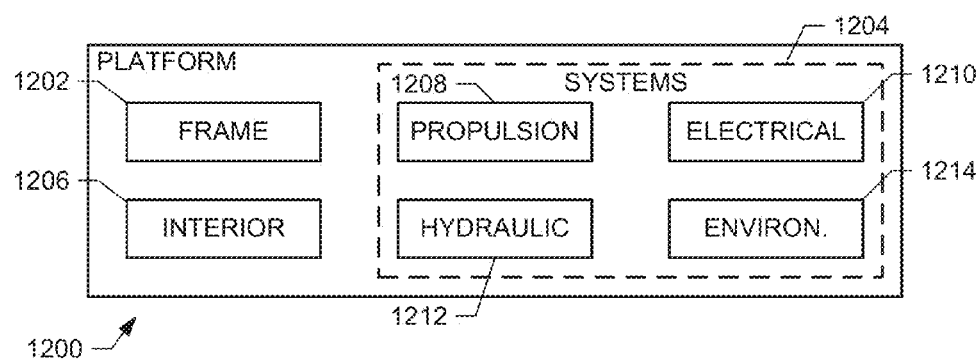
FIG. 12 is a block diagram of a platform.

Examples of the disclosure may be described in the context of a platform manufacturing and service method 1100 as shown in FIG. 11 and a platform 1200, such as an aircraft, as shown in FIG. 12. During preproduction, the example method 1100 may include specification and design (block 1102) of the platform 1200 (e.g., an aircraft). Preproduction may further include material procurement (block 1104). During production, component and subassembly manufacturing (block 1106) and system integration (block 1108) of the platform 1200 (e.g., an aircraft) takes place. Thereafter, the platform 1200 (e.g., an aircraft) may go through certification and delivery (block 1110) in order to be placed in service (block 1112). While in service by a customer, the platform 1200 (e.g., an aircraft) is scheduled for routine maintenance and service (block 1114), which may also include modification, reconfiguration, refurbishment, etc. The example system, user interfaces 300-700, and methods 800-1000 of FIGS. 1 and 3-10 may be implemented during and/or in support of the maintenance and service procedures of block 1114.

Each of the operations of the example method 1100 may be performed or carried out by a system integrator, a third party, and/or an operator (e.g., a customer). For the purposes of this description, a system integrator may include without limitation any number of platform (e.g., aircraft) manufacturers and major-system subcontractors; a third party may include without limitation any number of venders, subcontractors, and suppliers; and an operator may be an airline, leasing company, military entity, service organization, and so on.

As shown in FIG. 12, the platform 1200 (e.g., an aircraft) produced by example method 1100 may include a frame 1202 with a plurality of systems 1204 and an interior 1206. Examples of high-level systems 1204 include one or more of a propulsion system 1208, an electrical system 1210, a hydraulic system 1212, and an environmental system 1214. The example systems and methods disclosed herein may be integrated into the example systems 1204, 1208, 1210, 1212, 1214. Any number of other systems may be included.

Apparatus and methods embodied herein may be employed during any one or more of the stages of the production and service method 1100. For example, components or subassemblies corresponding to production process 1106 may be fabricated or manufactured in a manner similar to components or subassemblies produced while the platform 1200 (e.g., an aircraft) is in service 1112. Also, one or more apparatus embodiments, method embodiments, or a combination thereof may be implemented during the production stages 1106 and 1108, for example, by substantially expediting assembly of or reducing the cost of a platform 1200 (e.g., an aircraft). Similarly, one or more of apparatus embodiments, method embodiments, or a combination thereof may be utilized while the platform 1200 (e.g., spacecraft) is in service 1112, for example and without limitation, to maintenance and service 1114.

Figure 13:
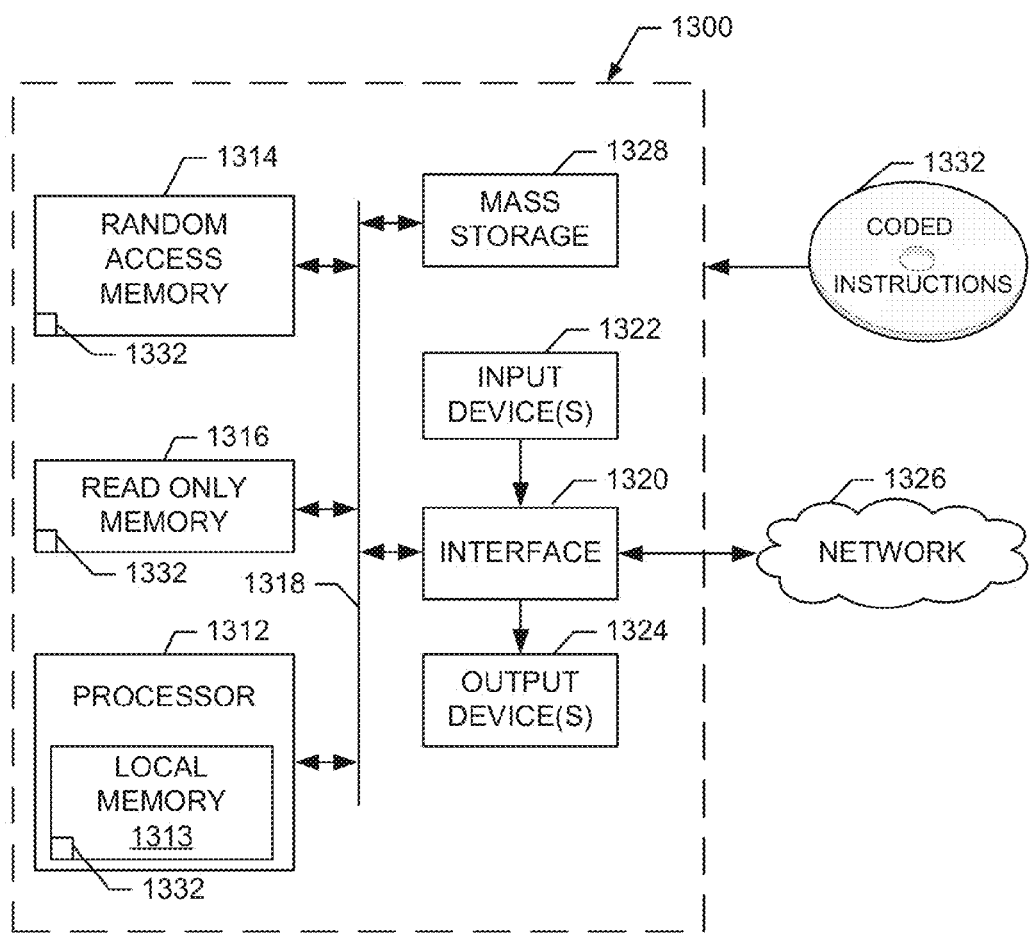
FIG. 13 is a block diagram of an example processor platform that may be used to implement the methods and apparatus described herein.

FIG. 13 is a block diagram of an example processor platform 1300 to implement the methods of FIGS. 8, 9A, 9B, and 10 and/or to implement the system 100 and/or the user interfaces 300-700 of FIGS. 1 and/or 3-7. The processor platform 1300 can be, for example, a server, a personal computer, a laptop or notebook computer, a tablet computer, a mobile device, or any other type of computing device or combination of computing devices.

The processor platform 1300 of the instant example includes a processor 1312. For example, the processor 1312 can be implemented by one or more microprocessors or controllers from any desired family or manufacturer.

The processor 1312 includes a local memory 1313 (e.g., a cache) and is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 also includes an interface circuit 1320. The interface circuit 1320 may be implemented by any type of interface standard, such as an Ethernet interface, a universal serial bus (USB), and/or a PCI express interface.

One or more input devices 1322 are connected to the interface circuit 1320. The input device(s) 1322 permit a user to enter data and commands into the processor 1312. The input device(s) can be implemented by, for example, a keyboard, a mouse, a touchscreen, a voice recognition system, and/or any other method of input or input device.

One or more output devices 1324 are also connected to the interface circuit 1320. The output devices 1324 can be implemented, for example, by display devices (e.g., a liquid crystal display, a cathode ray tube display (CRT), a printer and/or speakers). The interface circuit 1320, thus, typically includes a graphics driver card.

The interface circuit 1320 also includes a communication device such as a modem or network interface card to facilitate exchange of data with external computers via a network 1326 (e.g., an Ethernet connection, a wireless local area network (WLAN) connection, coaxial cable, a cellular telephone system, etc.).

The processor platform 1300 also includes one or more mass storage devices 1328 for storing software and data. Examples of such mass storage devices 1328 include floppy disk drives, hard drive disks, compact disk drives and digital versatile disk (DVD) drives. The mass storage device 1328 may implement the databases 108 and/or 112 of FIG. 1 and/or the hierarchical structure 200 of FIG. 2.

Coded instructions 1332 to implement the methods of FIGS. 8, 9A, 9B, and/or 10 may be stored in the mass storage device 1328, in the volatile memory 1314, in the non-volatile memory 1316, and/or on a removable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   generating, using a processor, first keypoint signatures of an object from an image of the object; and
   identifying the object, using the processor, using the first keypoint signatures, wherein identifying the object comprises:
   comparing the first keypoint signatures to assembly reference keypoint signatures, the assembly reference keypoint signatures comprising keypoint signatures of multiple views of assemblies;
   based on the comparison of the first keypoint signatures to the assembly reference keypoint signatures, narrowing a search space to include component reference keypoint signatures that correspond to one of the assembly reference keypoint signatures;
   comparing the first keypoint signatures to the component reference keypoint signatures in the search space, the component reference keypoint signatures comprising keypoint signatures of components that are part of an assembly from which the one of the assembly reference keypoint signatures is generated; and
   matching one of the first keypoint signatures to one of the component reference keypoint signatures in the search space.

2. The method as defined in claim 1, further comprising generating the component reference keypoint signatures from computer models of the components.

3. The method as defined in claim 2, further comprising generating the assembly reference keypoint signatures from computer models of the assemblies, the computer models of the assemblies comprising the computer models of the components.

4. The method as defined in claim 1, wherein the first keypoint signatures comprise keypoint signatures generated from multiple images including different viewpoints of the object.

5. The method as defined in claim 1, wherein the object is a first one of the components, the method further comprising generating second keypoint signatures of an assembly including the first one of the components from an image of the assembly, wherein identifying the object further comprises:
   comparing the second keypoint signatures to the assembly reference keypoint signatures, the narrowing of the search space being based on the comparing of the second keypoint signatures to the assembly reference keypoint signatures; and
   comparing the first keypoint signatures to a first subset of the component reference keypoint signatures that corresponds only to a first one of the components in the assembly; and
   when the first keypoint signatures do not match the first subset of the component reference keypoint signatures, comparing the first keypoint signatures to a second subset of the component reference keypoint signatures that corresponds only to a second one of the components in the assembly.

6. The method as defined in claim 1, further comprising returning a characteristic of the object based on identifying the object, the characteristic comprising at least one of a part identification number, a model number, a stock keeping number, a sub-assembly identifier, an assembly identifier, or a location on a vehicle.

7. The method as defined in claim 6, wherein identifying the object comprises identifying an object in a database having a keypoint signature matching one of the first keypoint signatures.

8. An apparatus, comprising:
a keypoint signature generator to generate first keypoint signatures of an object from an image of the object; and
a keypoint signature matcher to identify the object using the first keypoint signatures by:
comparing the first keypoint signatures to assembly reference keypoint signatures, the assembly reference keypoint signatures comprising keypoint signatures of multiple views of assemblies;
based on the comparison of the first keypoint signatures to the assembly reference keypoint signatures, narrowing a search space to include component reference keypoint signatures that correspond to one of the assembly reference keypoint signatures;
comparing the first keypoint signatures to the component reference keypoint signatures in the search space, the component reference keypoint signatures comprising keypoint signatures of components that are part of an assembly from which the one of the assembly reference keypoint signatures is generated; and
matching one of the first keypoint signatures to one of the component reference keypoint signatures in the search space.

9. The apparatus as defined in claim 8, further comprising a reference signature generator to generate the component reference keypoint signatures from computer models of the components.

10. The apparatus as defined in claim 9, wherein the reference signature generator is to:
access computer models of the assemblies from a computer aided design database; and
generate the assembly reference keypoint signatures from the computer models of the assemblies, the computer models of the assemblies comprising the computer models of the components.

11. The apparatus as defined in claim 8, further comprising an image generator to capture the image of the object.

12. The apparatus as defined in claim 8, further comprising a keypoint signature database, wherein the component reference keypoint signatures and the assembly reference keypoint signatures are related in the keypoint signature database as components of assemblies.

13. The apparatus as defined in claim 12, wherein the keypoint signature matcher is to compare the first keypoint signatures to the component reference keypoint signatures in response to matching a first one of the first keypoint signatures to a first one of the assembly reference keypoint signatures related to the component reference keypoint signatures in the keypoint signature database.

14. The apparatus as defined in claim 8, wherein the keypoint signature generator is to:
prompt for an indication of the object within the image of the object;
generate a first one of the first keypoint signatures of a first portion of the image within the indication of the object; and
generate a second one of the first keypoint signatures of a second portion of the image larger than and including the indication of the object.

15. A tangible computer readable storage medium comprising computer readable instructions which, when executed, cause a logic circuit to at least:
generate first keypoint signatures of an object from an image of the object; and
identify the object using the first keypoint signatures, wherein the instructions are to cause the logic circuit to identify the object by:
comparing the first keypoint signatures to assembly reference keypoint signatures, the assembly reference keypoint signatures comprising keypoint signatures of multiple views of assemblies;
based on the comparison of the first keypoint signatures to the assembly reference keypoint signatures, narrowing a search space to include component reference keypoint signatures that correspond to one of the assembly reference keypoint signatures;
comparing the first keypoint signatures to the component reference keypoint signatures in the search space, the component reference keypoint signatures comprising keypoint signatures of components that are part of an assembly from which the one of the assembly reference keypoint signatures is generated; and
matching one of the first keypoint signatures to one of the component reference keypoint signatures in the search space.

16. The storage medium as defined in claim 15, wherein the instructions are further to cause the logic circuit to generate the component reference keypoint signatures from computer models of the components.

17. The storage medium as defined in claim 16, wherein the instructions are further to cause the logic circuit to generate the assembly reference keypoint signatures from computer models of the assemblies, the computer models of the assemblies comprising the computer models of the components.

18. The storage medium as defined in claim 15, wherein the first keypoint signatures comprise keypoint signatures generated from multiple images including different viewpoints of the object.

19. The storage medium as defined in claim 15, wherein the object is a first one of the components, the instructions to further cause the logic circuit to generate second keypoint signatures of an assembly including the first one of the components from an image of the assembly, the instructions to cause the logic circuit to identify the object by:
comparing the second keypoint signatures to the assembly reference keypoint signatures, the narrowing of the search space being based on the comparing of the second keypoint signatures to the assembly reference keypoint signatures; and
comparing the first keypoint signatures to a first subset of the component reference keypoint signatures that corresponds only to a first one of the components in the assembly; and
when the first keypoint signatures do not match the first subset of the component reference keypoint signatures, comparing the first keypoint signatures to a second subset of the component reference keypoint signatures that corresponds only to a second one of the components in the assembly.

20. The storage medium as defined in claim 19, wherein the instructions are further to cause the logic circuit to prompt a user for an identification of the object within the at least one image of the assembly.

21. The method of claim 1, wherein generating the first keypoint signatures of the object includes generating the first keypoint signatures from a first component of a vehicle, a sub-assembly of the vehicle that includes the first component, and an assembly of the vehicle that includes the sub-assembly.

* * * * *